US012323428B2

(12) United States Patent
Drake, II

(10) Patent No.: US 12,323,428 B2
(45) Date of Patent: Jun. 3, 2025

(54) FEDERATED IDENTITY VERIFICATION AND ACCESS CONTROL FOR PUBLIC SERVICE ENTITIES

(71) Applicant: AT&T Intellectual Property I, L.P., Atlanta, GA (US)

(72) Inventor: Alton W. Drake, II, New Port Richey, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 189 days.

(21) Appl. No.: 18/054,874

(22) Filed: Nov. 11, 2022

(65) Prior Publication Data

US 2024/0163289 A1    May 16, 2024

(51) Int. Cl.
*H04L 9/40* (2022.01)
*G06F 21/33* (2013.01)

(52) U.S. Cl.
CPC ........ *H04L 63/102* (2013.01); *H04L 63/0853* (2013.01); *H04L 63/10* (2013.01); *G06F 21/335* (2013.01)

(58) Field of Classification Search
CPC ..... H04L 63/10; H04L 63/101; H04L 63/102; H04L 63/0853; H04L 63/08; H04L 9/32; H04L 9/3234; G06F 21/30; G06F 21/31; G06F 21/335; G06F 21/44; H04W 12/06; H04W 12/08; H04W 12/084
See application file for complete search history.

(56) References Cited

U.S. PATENT DOCUMENTS

| 7,568,218 | B2 * | 7/2009 | Garg | H04L 63/10 |
| | | | | 713/185 |
| 11,310,104 | B2 * | 4/2022 | Stockert | H04L 43/0876 |
| 2011/0072502 | A1 * | 3/2011 | Song | G06Q 10/10 |
| | | | | 709/206 |
| 2014/0317413 | A1 * | 10/2014 | Deutsch | H04L 63/145 |
| | | | | 713/176 |
| 2015/0026240 | A1 * | 1/2015 | Martini | H04L 67/54 |
| | | | | 709/203 |
| 2015/0200966 | A1 * | 7/2015 | Kasturirangan | H04L 63/10 |
| | | | | 726/4 |

(Continued)

OTHER PUBLICATIONS

Fisher, B., et al., "Attribute Based Access Control", NIST Special Publication 1800-3B, Sep. 2017, accessed from https://www.nccoe.nist.gov/publication/1800-3/VolB/index.html, 45 pages.

(Continued)

*Primary Examiner* — Shaqueal D Wade-Wright

(57) ABSTRACT

A processing system including at least one processor associated with a second public service entity may obtain a notification of at least a first guest user to access at least one network-based resource of the second public service entity, where the at least the first guest user is associated with a first public service entity, and may obtain a request from a first device of the at least the first guest user to access the at least one network-based resource of the second public service entity. The processing system may then query an attribute provider to obtain one or more attributes of the first guest user and grant the first device an access to the at least one network-based resource of the second public service entity in accordance with at least one policy based on the one or more attributes.

20 Claims, 3 Drawing Sheets

100

(56) References Cited

U.S. PATENT DOCUMENTS

2015/0381584 A1* 12/2015 Martini .............. H04L 63/0428
                                                          713/155
2019/0159119 A1*  5/2019 Djordjevic ............ H04W 48/18
2022/0338151 A1* 10/2022 Tang .................... H04W 48/18

OTHER PUBLICATIONS

Hardt, D., et al., "OpenID Attribute Exchange 1.0-Final", Dec. 5, 2007, accessed from https://openid.net/specs/openid-attribute-exchange-1_0.html, 10 pages.

Openid, "Welcome to OpenID Connect", accessed from https://openid.net/connect/ on Nov. 2, 2022, 4 pages.

* cited by examiner

US 12,323,428 B2

FEDERATED IDENTITY VERIFICATION AND ACCESS CONTROL FOR PUBLIC SERVICE ENTITIES

The present disclosure relates generally to communication network operations, and more particularly to methods, computer-readable media, and apparatuses for granting a first device of at least a first guest user associated with a first public service entity access to at least one network-based resource of a second public service entity in accordance with at least one policy based on one or more attributes obtained from an attribute provider.

BACKGROUND

In many large-scale public emergencies, personnel of public service entities (PSEs) from other regions may be called to serve in an affected area. Typically, these personnel may undergo manual assurance and validation processes and procedures before gaining access to information systems of one or more PSEs of the affected area. For example, when responding to an emergency in the northeast region, utility workers, emergency medical service (EMS) personnel, or law enforcement personnel from other regions may need access to critical information, but are required to be authenticated and authorized before accessing such information.

SUMMARY

In one example, the present disclosure describes a method, computer-readable medium, and apparatus for granting a first device of at least a first guest user associated with a first public service entity access to at least one network-based resource of a second public service entity in accordance with at least one policy based on one or more attributes obtained from an attribute provider. For example, a processing system including at least one processor (e.g., associated with a "second" public service entity) may obtain a notification of at least a first guest user to access at least one network-based resource of the second public service entity, where the at least the first guest user is associated with a first public service entity, and may obtain a request from a first device of the at least the first guest user to access the at least one network-based resource of the second public service entity. The processing system may then query an attribute provider to obtain one or more attributes of the first guest user and grant the first device an access to the at least one network-based resource of the second public service entity in accordance with at least one policy based on the one or more attributes.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
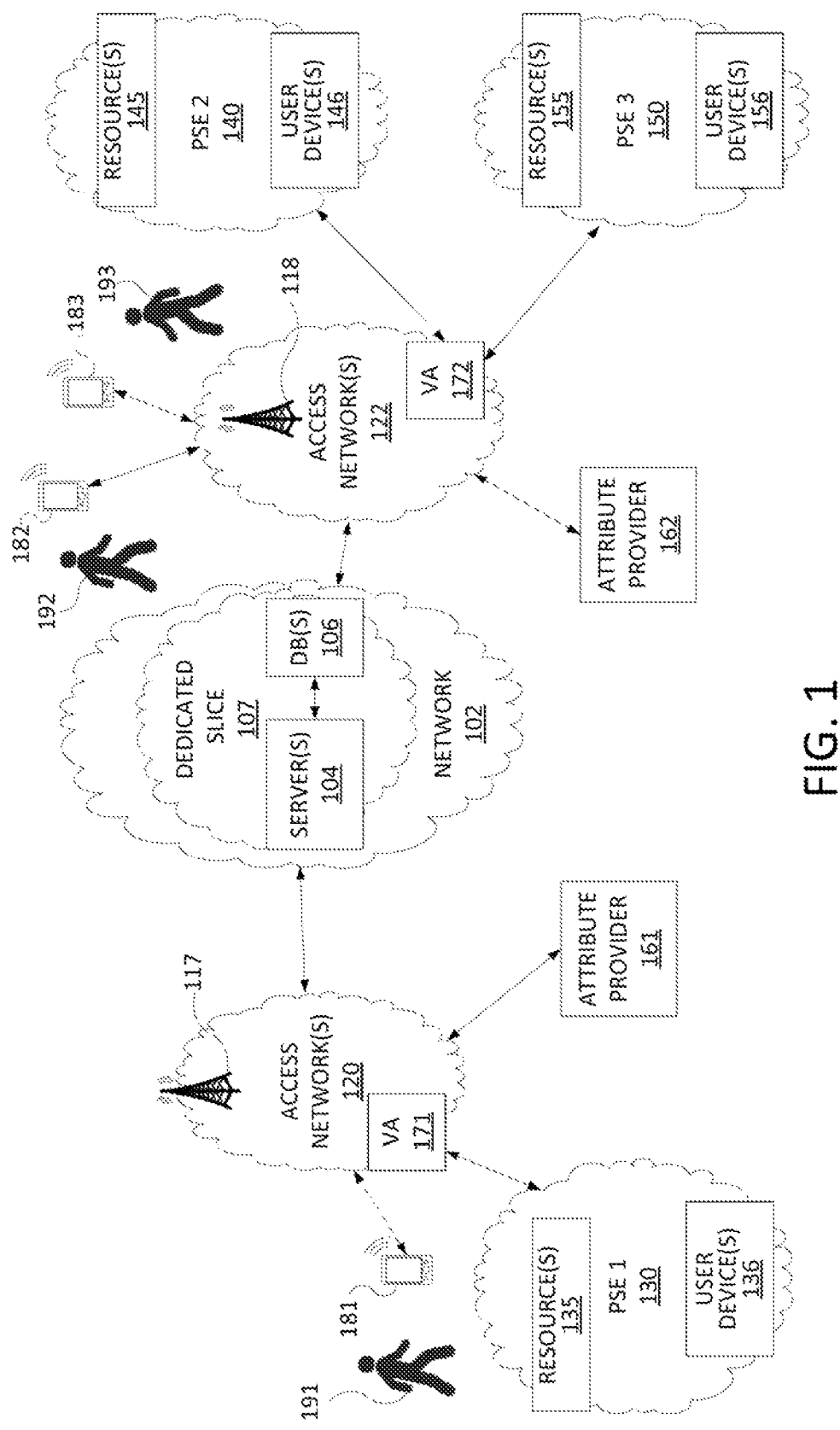
FIG. 1 illustrates an example network related to the present disclosure.

Examples of the present disclosure provide for methods, computer-readable media, and apparatuses for granting a first device of at least a first guest user associated with a first public service entity access to at least one network-based resource of a second public service entity in accordance with at least one policy based on one or more attributes obtained from an attribute provider. As noted above, in many large-scale public emergencies (e.g., hurricanes, wild fires, earthquakes, etc.), personnel of public service/safety entities (PSEs) from other regions may be called to serve in an affected area. Typically, these personnel may undergo manual assurance and validation processes and procedures before gaining access to information systems of one or more PSEs of the affected area. Different regions (or PSEs within various regions) may have different approaches and in some cases, limited resources to on-boarding visiting PSE personnel (broadly "guest users"). In addition, these ad-hoc procedures may take up critical time, which can mean the difference between a mild impact and a significant impact on the ability to respond to an emergency. Examples of the present disclosure are described herein illustratively in connection with first responders (e.g., firefighters, police, emergency medical service (EMS) personnel, etc.) and/or governmental or quasi-governmental entities (e.g., military, public health entities, hazardous materials (hazmat) units, etc.) that are entitled to access and utilize a priority network, or priority network slice(s). However, examples of the present disclosure may also include other PSEs that may provide important services in emergencies and disaster situations. For instance, this can include electric, water, gas, and sewerage utilities, and so forth.

In one example, the present disclosure comprises a virtual appliance (VA) assigned to one or more PSE members of a "community of interest" (e.g., law enforcement PSEs, utility PSEs, veterinary care PSEs, etc.). A VA permits each PSE to attach their enterprise resources for managed access. A VA may provide attribute based access control (ABAC) and policy based access control (PBAC) to resources that a PSE desires to share with other members in a community of interest. During emergencies or disaster situations users associated with PSE members within a communities of interest can respond to events without the concern for establishing or revalidating their access credentials, thereby assisting in the ability to respond quickly in areas outside their geographic region. The task of a guest user accessing information resources of a PSE in the visited region is made easier, because identities are federated and authorization attributes are accessible among PSEs joined into communities of interest via a network of VAs.

In one example, the present disclosure connects PSEs into attribute exchange networks (AXNs) organized around communities of interest, and having the ability to connect to regional enterprise resources. A guest user visiting a region of PSE 2 can authenticate via a home PSE (PSE 1). A VA associated with PSE 2 may then automatically gather attributes from an attribute provider (AP) storing attributes of users in the community of interest (e.g., personnel of a plurality of PSEs within the community of interest). As such, the guest user may gain access to information resources without having to be authenticated and authorized by an in-region authority before obtaining access to such information resources. In one example, the virtual appliance may perform various functions to protect and secure access to enterprise-based information resources of PSE 2. In particular, in one example, the VA may permit only those PSEs personnel who have properly authenticated with their home PSE and are federated within the community of interest to access resources of PSE 2. In one example, the VA provides authorized PSE personnel with access to attributes held by 3rd-party trusted AP. Alternatively, or in addition, in one example the VA associated with PSE 2 may obtain attributes of a guest user from an AP, may evaluate the attributes against one or more policies/rules, and may permit or deny access based on such policy (or policies) as set by PSE 2.

In one example, to fulfill the objective of providing PSEs with access to a rich set of decision-making attributes, the VA may perform ABAC/PBAC operations to provide enterprise class implementation that enables federated identity management between multiple enterprises using an attribute exchange network (AXN). The availability of an AXN framework to identity providers (e.g., a home PSE and/or a VA associated therewith), relying parties (RPs) (e.g., a visited PSE and/or a VA associated therewith), and attribute providers (AP) enhance the granularity of access control policies by increasing the range of possible attributes available when making automated access control decisions. Rather than populating pre-provisioned roles into identity credential and access management (ICAM) components of several different PSE enterprises, ABAC/PBAC technology of the VA enables fine-grain authorization decisions based on information (attributes) about a subject/guest user (such as title, division, certifications, and training). In conjunction with a service that enables a range of identity attributes to be accessed or verified, ABAC/PBAC implementations enable a federated identity management environment, which makes it possible to share information technology (IT) resources across multiple enterprises. When access control decisions are granular, enterprise risks, including insider threats, loss of personally identifiable information, and fraud, are reduced, thereby allowing for personnel from similar working communities to be deployed across logical and physical boundaries and gain access to resources, especially during emergencies. The VA ICAM federation, ABAC/PBAC and the AXN framework solution stack of the present disclosure is modular and expandable, allowing PSE enterprises to have flexibility in their implementations with the ability to integrate with the greater emergency management ecosystem.

Thus, examples of the present disclosure provide guest users timely access to information resources of a visited PSE in response to emergency situations. In addition, examples of the present disclosure abstract the complexity of authenticating and authorizing visiting PSE personnel (e.g., guest users) in a timely manner. In addition, examples of the present disclosure may enforce standards for collecting decision-making attributes for communities of PSEs and for communicating such attributes among PSEs in a community. These and other aspects of the present disclosure are discussed in greater detail below in connection with the examples of FIGS. 1-3.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a telecommunication network. The network 102 may be in communication with one or more access networks 120 and 122, and the Internet (not shown). In one example, network 102 may combine core network components of a cellular network with components of a triple play service network; where triple-play services include telephone services, Internet services and video services (e.g., television services) to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a video broadcast network, e.g., a traditional cable provider network or an Internet Protocol Television (IPTV) network, as well as an Internet Service Provider (ISP) network. In one example network 102 may include a dedicated slice 107, e.g., a "network slice" that is reserved for first responders and/or governmental entities or quasi-governmental entities. For instance, dedicated slice 107 may comprise cellular core network components that service such entities, users associated with such entities, and/or their endpoint devices, while other users, entities, and/or their endpoint devices may be serviced by a different network slice, or slices. In one example, dedicated slice 107 may include one or more servers 104 and one or more databases (DBs) 106, as discussed in further detail below. In one example, network 102 may also include a plurality of television (TV) servers (e.g., a broadcast server, a cable head-end), a plurality of content servers, an advertising server, an interactive TV/video-on-demand (VoD) server, and so forth. For ease of illustration, various additional elements of network 102 are omitted from FIG. 1.

In one example, the access networks 120 and 122 may comprise fiber optic access networks (e.g., fiber to the curb (FTTC) and/or fiber to the premises (FTTP) access networks), Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3 rd party networks, and the like. For example, the operator of network 102 may provide data services, voice/telephony services, cable television services, an IPTV service, a streaming service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 may include at least wireless access point 117 (e.g., a cellular base station). Similarly, access network(s) 122 may include at least wireless access point 118 (e.g., a cellular base station).

In one example, the access networks 120 may be in communication with various devices, local networks, and/or computing systems/processing systems. For instance, the access networks 120 may be in communication with a network of a public service entity (PSE) 1 (130), which may contain one or more resources 135 (e.g., information resources, such as utility maps, property records (e.g., architectural plans, wiring diagrams, etc.), property ownership records, medical records, personnel records and contact information of various personnel of PSE 1, purchase order information (e.g., to order supplies, etc.), passcodes/keys (such as to disable or activate fire suppression systems, public announcement systems, etc.), and so forth). The nature of the resource(s) 135 may vary depending upon the nature of the PSE 1 (e.g., first responders (e.g., firefighters, police, emergency medical service (EMS) personnel, etc.) and/or governmental or quasi-governmental entities (e.g., military, public health entities, etc.), utilities, and so forth). In one example, the resources 135 may comprise one or more database servers storing information that may be accessed by personnel of PSE 1 (as well as guest users having temporary authorizations).

User devices 136 may comprise various computing devices (broadly "endpoint devices") that may be used by personnel of PSE 1 to access resources 135 and to perform various other tasks, such as to communicate with the general public in an area, to add new information to resources 135 (e.g., adding architectural plans for a home addition to a property record, entering a new infrastructure element to a utility map, etc.), and so forth. For instance, user devices 136 may include desktop computers, laptop computers, tablet computing devices, augmented reality (AR) headsets, or the like. User device 136 may be equipped with wired and/or wireless networking/communication capability. In this regard, user devices 136 may include transceivers for wireless communications, e.g., for Institute for Electrical and Electronics Engineers (IEEE) 802.11 based communications (e.g., "Wi-Fi"), IEEE 802.15 based communications (e.g., "Bluetooth", "ZigBee", etc.), cellular communication (e.g., 3G, 4G/LTE, 5G, etc.), and so forth. Access networks 120 may also be in communication with a mobile device 181 of user 191. For instance, mobile device 181 may comprise a cellular smart phone, a laptop, a tablet computer, a wearable computing device (e.g., an AR headset, such as smart glasses or goggles), or the like. As such, mobile device may also include transceivers for wireless communications, e.g., cellular communication, IEEE 802.11 based communications, and/or IEEE 802.15 based communications, and so forth.

As illustrated in FIG. 1, access networks 120 are also in communication with an attribute provider 161. For instance, attribute provider (AP) 161 may represent one or more computing devices/processing systems storing sets of attributes of various users of one or more PSEs within one or more communities of interest. For example, AP 161 may comprise one or more database servers for storing user attributes. As further illustrated in FIG. 1, access networks 120 may include a virtual appliance (VA) 171. In one example, VA 171 may be instantiated/hosted on edge cloud components (e.g., server(s), network function virtualization infrastructure (NFVI), etc.) deployed within access networks 120. In other words, VA 171 may comprise a server hosting a virtual machine, container, or the like for operating as a virtual appliance (VA) as described herein. In accordance with the present disclosure, VA 171 may comprise a computing system or server, or one or more computing systems or servers, such as computing system 300 depicted in FIG. 3, and may individually or collectively be configured to perform operations or functions for granting a first device of at least a first guest user associated with a first public service entity access to at least one network-based resource of a second public service entity in accordance with at least one policy based on one or more attributes obtained from an attribute provider (such as illustrated and described in connection with the example method 200 of FIG. 2).

Figure 3:
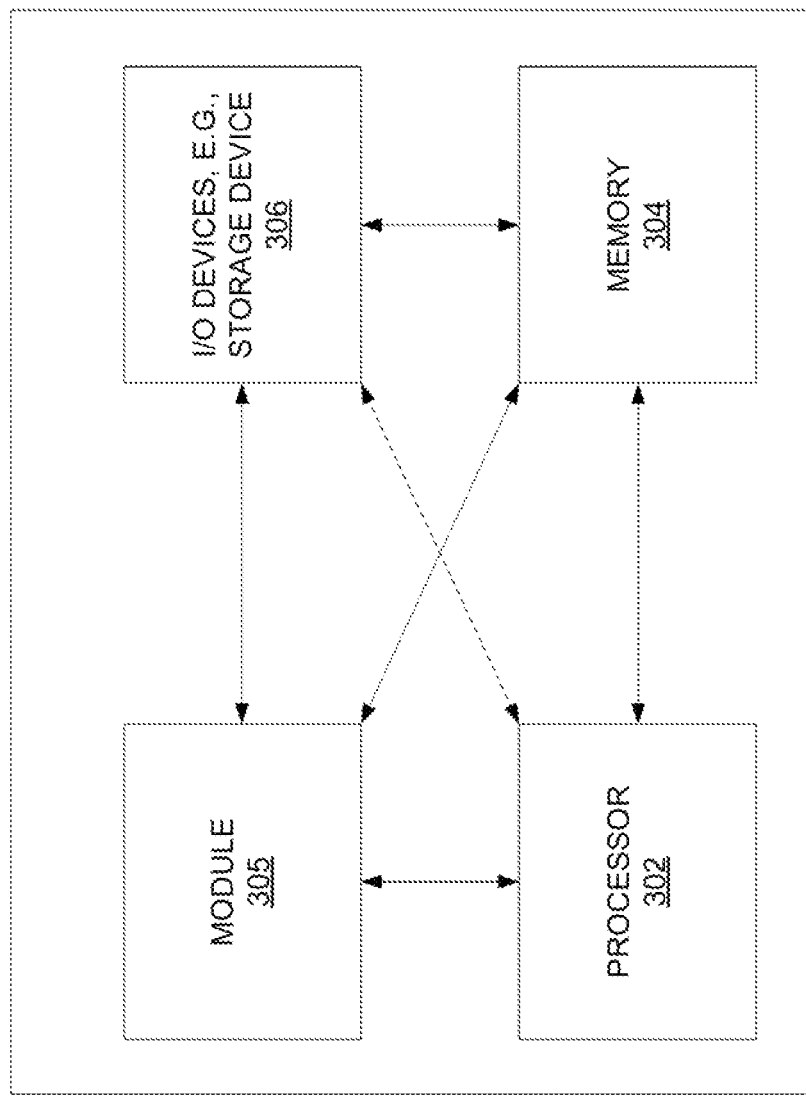
FIG. 3 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Similarly, access networks 122 may be in communication with various devices, local networks, and/or computing systems/processing systems. For instance, the access networks 121 may be in communication with a network of a public service entity (PSE) 2 (140) which may contain one or more resources 145. The nature of the resource(s) 145 may vary depending upon the nature of the PSE 2. In one example, the resources 145 may comprise one or more database servers storing information that may be accessed by personnel of PSE 2 (as well as guest users having temporary authorizations). User devices 146 may be of a same or similar nature as user device 136 of PSE 1, and may comprise various computing devices (e.g., endpoint devices) that may be used by personnel of PSE 2 to access resources 145 and to perform various other tasks, such as to communicate with the general public in an area, to add new information to resources 145, and so forth.

As further illustrated in FIG. 1, the access networks 121 may be in communication with networks of a public service entity (PSE) 3 (150) which may contain one or more resources 155. The nature of the resource(s) 155 may vary depending upon the nature of the PSE 3. In one example, the resources 155 may comprise one or more database servers storing information that may be accessed by personnel of PSE 3 (as well as guest users having temporary authorizations). User devices 156 may be of a same or similar nature as user devices 136 of PSE 1 and/or user devices 146 of PSE 2, and may comprise various computing devices (e.g., endpoint devices) that may be used by personnel of PSE 3 to access resources 155 and to perform various other tasks, such as to communicate with the general public in an area, to add new information to resources 155, and so forth.

Access networks 122 may also be in communication with mobile device 182 of user 192 and mobile device 183 of user 193. For instance, mobile devices 182 and 183 may each comprise a cellular smart phone, a laptop, a tablet computer, a wearable computing device (e.g., an AR headset, such as smart glasses or goggles), or the like, and may be of the same or similar nature as mobile device 181. As illustrated in FIG. 1, access networks 122 are also in communication with an attribute provider 162. For instance, attribute provider (AP) 162 may represent one or more computing devices/processing systems storing sets of attributes of various users of one or more PSEs within one or more communities of interest. For example, AP 162 may comprise one or more database servers for storing user attributes. In one example, AP 162 may store the same user attribute records as AP 161, or may store partially overlapping user attribute records (e.g., for a same community of interest).

As further illustrated in FIG. 1, access networks 120 may include a virtual appliance (VA) 172. In one example, VA 172 may be instantiated/hosted on edge cloud components (e.g., server(s), network function virtualization infrastructure (NFVI), etc.) deployed within access networks 122. In other words, VA 172 may comprise a server hosting a virtual machine, container, or the like for operating as a virtual appliance (VA) as described herein. In accordance with the present disclosure, VA 172 may comprise a computing system or server, or one or more computing systems or servers, such as computing system 300 depicted in FIG. 3, and may individually or collectively be configured to perform operations or functions for granting a first device of at least a first guest user associated with a first public service entity access to at least one network-based resource of a second public service entity in accordance with at least one policy based on one or more attributes obtained from an attribute provider (such as illustrated and described in connection with the example method 200 of FIG. 2). In one example, VA 172 may be the same or similar to VA 171, but may service a different PSE (or different PSEs, e.g., in this case, both PSE 2 and PSE 3). Access networks 120 and 122 may transmit and receive communications between mobile devices 181-183, VA 171, VA 172, PSE 1, PSE 2, PSE 3, attribute providers 161 and 162, server(s) 104 and/or database(s) (DB(s)) 106, other components of network 102, devices reachable via the Internet in general, and so forth. In this regard, mobile devices 181-183 may each include one or more radio frequency (RF) transceivers for cellular communications and/or for non-cellular wireless communications.

In the example of FIG. 1, user 191 and user 192 may be associated with PSE 1 (e.g., users 191 and 192 are personnel of PSE 1) and may each be assigned one or more attributes based upon the users' assigned duties, qualifications, certifications, and so forth. For instance, user 191 may be an ambulance driver and may have a certification to drive ambulances, commercial or other larger vehicles. In addition, user 191 may also be a qualified emergency medical technician (EMT) "level 2." User 192 may not have a certification to drive ambulances, but may be qualified as an EMT "level 3." In one example, PSE 1 (e.g., other personnel thereof via user device(s) 136) may populate these attributes into user records stored by attribute provider 161. In one example, attribute provider 161 may also share these records (and any updates, changes, or the like) with attribute provider 162. For instance, in one example, attribute providers 161 and 162 may maintain respective copies of user records for users of different PSEs within a community of interest. In one example, a PSE may communicate with the closest attribute provider to obtain user records/attributes and to make changes to user records for users associated with the particular PSE. Additions and changes may then be replicated across other attribute providers servicing the same community of interest. In this regard, user 193 may be associated with PSE 2, which may populate a respective user record with attribute provider 162 to include the attributes of user 193.

When users 191-193 are accessing their respective home PSEs networks, the users 191-193 may be authenticated and authorized via components within the networks 130 and 140 of PSE 1 and PSE 2, respectively (e.g., access being granted to mobile devices 181-183, respectively). However, as noted above, there are often scenarios, such as public emergencies, in which a PSE assigned to an area may have a need or may benefit from outside assistance from personnel of other PSEs. In an illustrative example, there may be a public emergency in a region/area associated with PSE 2. PSE 2 may therefore transmit requests to one or more other PSEs within a community of interest for assistance (e.g., to obtain additional personnel/guest users). For illustrative purposes, PSE 1 and PSE 2 may be members of an "emergency medical" community of interest. As such, PSE 2 may transmit such a request to PSE 1. For example, a responsible personnel/user of PSE 2, via one of the users devices 146 may transmit a request to PSE 1, which may be received by a counterpart personnel/user, e.g., via one of user devices 136. The request may include a number of personnel/guest users needed, the roles and/or attributes needed, and the time for which guest users are needed (e.g., start, end, and/or duration, etc.). In one example, the request may also include compensation information, information on accommodations, meals, or other physical resources (e.g., if guest users must remain in a different area/region for an extended period of time), and so forth.

In one example, PSE 1 may respond with a number of users that are available for providing assistance to PSE 2. In one example, the response may also include specific identities of guest users who will be permitted (or assigned/ instructed) to assist PSE 2, device identifiers of mobile devices of such guest users, and so forth. In one example, PSE 2 may provide an access link, e.g., a uniform resource locator (URL) that may permit guest users, via their mobile devices, to connect to and access network-based resources of PSE 2. In particular, in one example, the URL may direct devices of guest users to connect to VA 172 associated with PSE 2. The link may be provided as part of the request, or may be provided following a confirmation from PSE 1 of the number and/or the identities of one or more guest users that may be sent to PSE 2.

In the present example, user 192 may be designated to assist PSE 2. As such, the access URL may be provided to mobile device 182. In one example, upon arriving an area/ region associated with PSE 2, user 192 may seek to connect to the network 140 of PSE 2 to access one or more resources (e.g., information resources) in connection with performing tasks/duties in accordance with the assignment to assist PSE 2. Accordingly, in one example, user 192 may click/access the URL via mobile device 182, which may cause mobile device 182 to establish communication with VA 172 in accordance with the URL.

In one example, the URL may include an indicator of the home PSE of the guest user 192 (PSE 1). Alternatively, or in addition, VA 172 may present a login screen to user 192 via mobile device 182 (e.g., via a webpage or dedicated application (app) installed and in operation on mobile device 182 for user authentication and/or for access to PSE resources). As such, user 192 may indicate a home PSE to which user 192 belongs. In any case, VA 172 may then transmit a request to PSE 1 to authenticate user 192 via mobile device 182, and may obtain from PSE 1 a confirmation of an authentication of user 192 via the mobile device 182. In one example, user 192 may provide login credentials (e.g., username and password) to VA 172, where VA 172 can forward the login credentials to PSE 1 for verification. Alternatively, PSE 1 can be notified of the request to access the network 140 of PSE 2 by user 192 via mobile device 182. PSE 1 may then present a login challenge for user 192 via the mobile device 182 (e.g., a push communication to the mobile device 182). In one example, the request to PSE 1 and the response from PSE 1 are to be implemented via the VA 171 associated with PSE 1.

In one example, VA 172 may determine a location of mobile device 182 (e.g., from cell/base station connection information, asserted global positioning system (GPS) location information, location sensing of mobile device 182 via wireless beacons deployed in an area/region of PSE 2, etc.). In one example, VA 172 may proceed with an authentication and admission process for user 192 via mobile device 182 when the location information matches an area/region of PSE 2. On the other hand, VA 172 may disallow the continuance of the authentication and admission process for user 192 via mobile device 182 when the location information does not match an area/region of PSE 2. For instance, for additional security and in accordance with the principle of least privilege, PSE 2 may prevent guest users from accessing information resources of PSE 2 until guest users are actually present within the area of service. For instance, if user 192 and mobile device 182 have not left an area associated the home PSE (PSE 1), VA 172 may deny access to mobile device 182, even if user 192 is otherwise an expected guest user who is designated to have access to resources 145 of PSE 2.

Assuming that user 192 (e.g., mobile device 182) is authenticated from PSE 1, VA 172 may then determine a level of access for user 192, e.g., which of resources 145 is user 192 to be permitted to access. In accordance with the present disclosure, VA 172 may communicate with attribute provider (AP) 162 to obtain attributes of user 192. In one example, user 192 may, via mobile device 182, provide consent to VA 172 to communicate with and obtain attributes from attribute provider 162. As such, attribute provider 162 may transmit attributes of user 192 to VA 172 in response to such a request. In the event that attribute provider 162 does not possess a user record for user 192, attribute provider 162 may also communicate with attribute provider 161 to obtain a copy of such record, or may direct VA 172 to contact attribute provider 161. As noted above, the attributes may include that user 192 is qualified as an EMT "level 3." In one example, VA 172 may grant the mobile device 182 access to the at least one of the resources 145 in accordance with at least one policy based on the one or more attributes. For instance, VA 172 may apply the at least one policy to the attribute(s) of user 192. The at least one policy may comprise at least one rule that associates at least one attribute with a permission to access one or more of the resources 145. In other words, VA 172 may provide attribute based access control (ABAC)/policy based access control (PBAC) on behalf of PSE 2 for guest users such as user 192.

It should be noted that although VA 172 implements ABAC/PBAC, PSE 2 remains in control of the policy, or policies that may be applied by VA 172. For instance, a level 3 EMT of PSE 1 may be permitted to access property records of any property within the jurisdiction of PSE 1. However, PSE 2 may not allow/enable level 3 EMTs to access such information. For instance, this may be reserved for police or fire personnel, or higher level supervisory personnel of an emergency medical service provider. Thus, user 192 should not be allowed to access more of the resources 145 than a similarly qualified user whose home PSE is PSE 2. In one example, user 192 may have multiple attributes which may entitle user 192 to have access to different resources form among resources 145 via mobile device 182 in accordance with one or more policies. For instance, this may include names, phone numbers, email addresses, etc. of other personnel of PSE 2 whom user 192 may need to work with or contact in connection with assisting PSE 2. In one example, the granting of the access may include transmitting an instruction to at least one component of network 140 of PSE 2 that controls an access to the resource(s) 145. For instance, the instruction may provide one or more device identifiers, and may indicate that the mobile device 182 is permitted to access the one or more of the resources 145. In one example, VA 172 may provide an access token to mobile device 182 that enables mobile device 182 to access at least one network-based resource of the second public service entity (with a same key or corresponding key being provided to at least one component of network 140 of PSE 2 that controls an access to the resource(s) 145).

As noted above, in one example, mobile device 182 may obtain network connectivity via a dedicated network slice that is reserved for public service entity usage (e.g., dedicated slice 107 of network 102, and likewise components of access network(s) 122 that are similarly designated/reserved). In one example, after authentication and authorization of mobile device 182 to access the one or more of resources 145, mobile device 182 may continue to be connected via access network(s) 122 and the dedicated slice 107 for connecting to PSE 2. Alternatively, or in addition, mobile device 182 may be handed off or may establish dual connectivity, e.g., via Wi-Fi or the like, with components of network 140 of PSE 2 directly.

It should be noted that VA 172 (and similarly VA 171) may comprise a plurality of modules to enable VA functions described herein. For instance, VA 172 may include an authentication policy enforcement module (e.g., to perform ICAM—guest user authentication as described above) and a policy decision module/policy decision point (e.g., to provide ABAC/PBAC grant of access to guest users as described above). In various examples VA 172 may also include a relying party (RP) subject attribute repository (e.g., to store attributes of guest users on a temporary basis, e.g., for a duration of each guest user's service to a visited PSE and/or for a defined duration of time thereafter, such as 48 hours, 7 days, etc.), an object attribute repository, an environment attribute repository, and/or an access control policy repository. The object attribute repository may contain labels for various protected resources (e.g., resources 145) which may be applied to access control decisions in accordance with one or more polices/rules for guest user access (e.g., in conjunction with user attributes, and/or other attributes such as environment variables/attributes). In this regard, it should be noted that an environment attribute repository may include indicators of certain environmental conditions such as whether an emergency condition exists (or still exists after a passage of time), etc. In addition, the access control policy repository may store the rules/policies for ABAC/PBAC as described herein (which may be retrieved by the policy decision module/policy decision point for ABAC/PBAC decision making).

It should be noted that the foregoing are just several examples of the use of a federated A×N system (e.g., VAs, APs, and the PSEs served thereby), and that other, further, and different examples may be established in connection with the example of FIG. 1. For instance, examples are described primarily on connection with VA 172 providing ICAM and ABAC/PBAC functions on behalf of PSE 2. However, VA 171 may provide the same or similar functions to on-board guest users (e.g., the mobile devices thereof) for PSE 1. Likewise, VA 172 may provide the same or similar functions of behalf of PSE 3. In other words, VA 172 may serve both PSE 2 and PSE 3. Collectively, VAs 171 and 172, and APs 161 and 162 may comprise an attribute exchange network (AXN) facilitating the exchange of attributes, and the use of such attributes to facilitate access decisions according to policies.

It should be noted that in accordance with the present disclosure a VA, such as VA 171 or VA 172, may provide various additional functions. For instance, VAs 171 and 172 may provide auditing and monitoring on behalf of PSEs, e.g., logging all access requests, access decisions, attributes used, subject (guest user) identities, etc., providing reports, responding to queries, providing analysis, and so forth. VAs 171 and 172 may also provide data protection measures, such as encrypting the transmission of attributes traveling between enterprises and across the attribute exchange service, encrypting data for all attribute and policy stores, protecting attribute values used within policy decision logic, and so forth. In this regard, VAs 171 and 172 may implement various privacy protection measures, including: maintaining encryption for data in transit and at rest to prevent eavesdroppers from decoding messages or determining that two authentication sessions involved the same subject and preventing the attribute exchange service from tracking subject across multiple transactions. For instance, the latter may include maintaining the anonymity of the relying party with respect to the attribute provider (e.g., so that attribute providers do not track users across PSEs to determine whether and when a user has been a guest user of another PSE, etc.), and so forth. In addition, VAs 171 and 172 may impose requirements for multi-factors authentication to achieve degrees of authentication confidence using a combination of factors such as physical and logical tokens and biometric factors throughout the above described authentication process(es).

In one example, VAs 171 and 172 may further provide attribute integrity verification. For example, VAs 171 and 172 may provide a relying party (RP) (e.g., a PSE to which a guest user may be seeking access) with assurance that the attributes received are from the intended source and have not been modified. This may include additional authentication between the RP (VA 171 or VA 172 on behalf of a PSE) and attribute provider (AP). In one example, VAs 171 and 172 may perform attribute validation by periodically revalidating each attribute in use. For instance, APs 161 and 162 may be re-queried to see if any attributes of any guest users have changed. Similarly, VAs 171 and 172 may communicate with APs 161 and 162 to provide attribute changes of users of respective home PSE networks associated with the respective ones of VAs 171 and 172 and APs 161 and 162.

As noted above, VAs 171 and 172 also provide for policy enforcement. For example, VAs 171 and 172 may ensure appropriate action is taken for failed authentication and authorization and may reduce (or eliminate) false positive/false negative results. In one example, VAs 171 and 172 may also provide identity lifecycle management for guest users, such as provisioning and de-provisioning accounts (e.g., for guest users), managing user/subject attributes, object attributes (e.g., the resource(s) to which access may be granted), environment attributes, and so forth, enforcing expiration policy (e.g., certificate/access token expiration), and so forth. In multi-tenancy scenarios (e.g., VA 172 serving PSE 2 and PSE 3) a VA may support secure logical or physical separation of tenant information and tenant processes.

It should also be noted that any number of server(s) 104 or database(s) 106 may be deployed. In one example, a communication network (e.g., comprising network 102, access networks 120 and 122, etc.) may provide a VA service to subscribing users and/or devices, e.g., in addition to phone, data, video, and/or other communication services. For instance, VAs 171 and 172 may be hosted and/or operated by a communication network operator for various PSEs. In one example, servers 104, DBs 106, VAs 171 and 172, APs 161 and 162, or any one or more of such devices in conjunction with, mobile devices 181-183 and so forth, may operate in a distributed and/or coordinated manner to perform various steps, functions, and/or operations described herein.

In addition, it should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. Similarly, although only two access networks 120 and 122 are shown, in other examples, access networks 120 and/or 122 may each comprise a plurality of different access networks that may interface with network 102 independently or in a chained manner. For example, networks 140 and 150 of PSE 2 and PSE 3, respectively, may be in communication with network 102 via different access networks, and mobile device 181 and network 130 of PSE 1, may be in communication with network 102 via two or more different access networks, and so forth. Thus, these and other modifications are all contemplated within the scope of the present disclosure.

Figure 2:
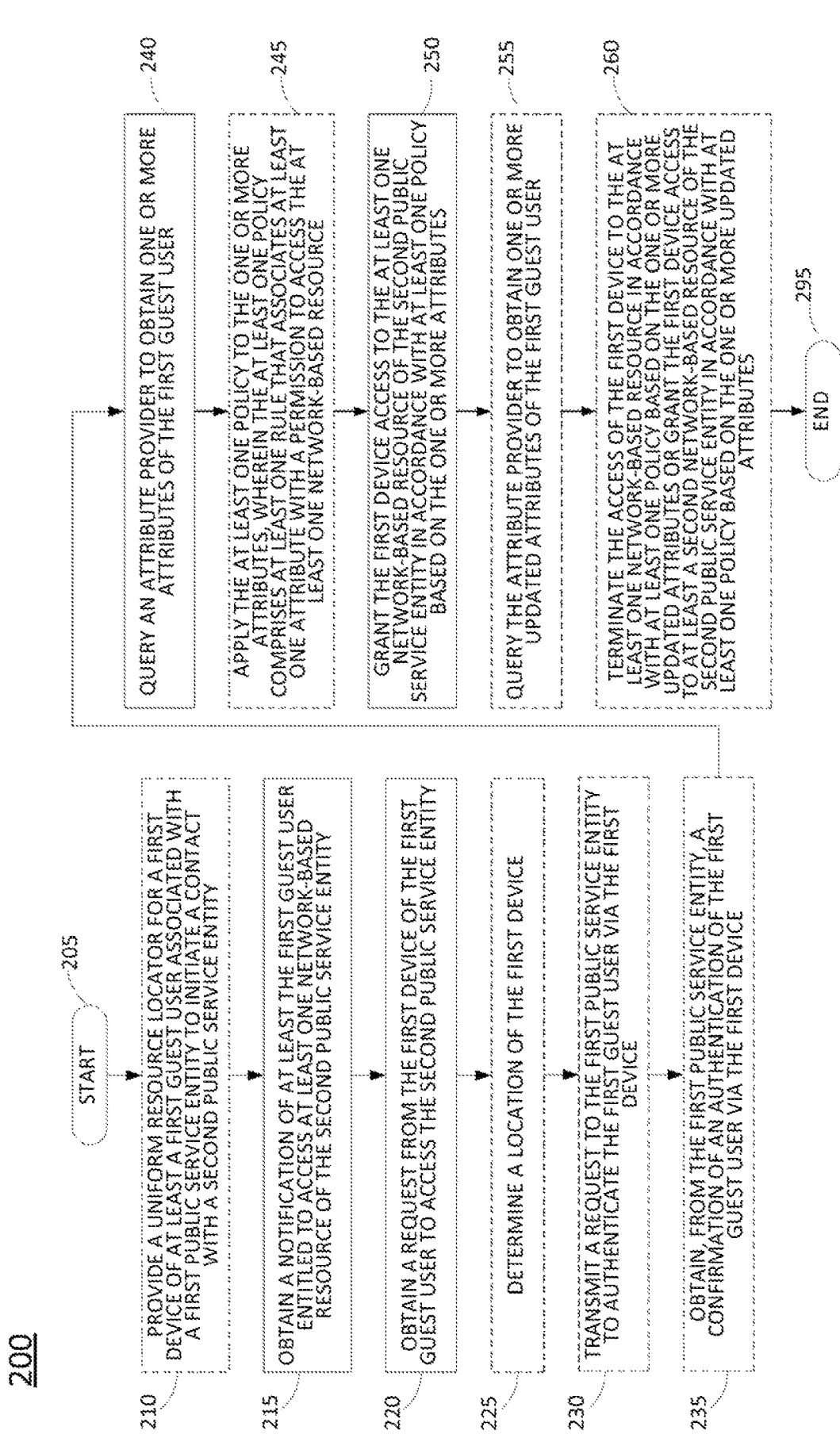
FIG. 2 illustrates a flowchart of an example method for granting a first device of at least a first guest user associated with a first public service entity access to at least one network-based resource of a second public service entity in accordance with at least one policy based on one or more attributes obtained from an attribute provider.

FIG. 2 illustrates a flowchart of an example method 200 for granting a first device of at least a first guest user associated with a first public service entity access to at least one network-based resource of a second public service entity in accordance with at least one policy based on one or more attributes obtained from an attribute provider. In one example, the method 200 is performed by a network-based component of the system 100 of FIG. 1, such as by VA 171 or VA 172, and/or any one or more components thereof (e.g., a processor, or processors, performing operations stored in and loaded from a memory), by VA 171 and/or VA 172 in conjunction with one or more other devices, such as APs 161 and/or 162, components of PSE networks 130, 140, and/or 150, mobile devices 181-183, and so forth. In one example, the steps, functions, or operations of method 200 may be performed by a computing device or system 300, and/or processor 302 as described in connection with FIG. 3 below. For instance, the computing device or system 300 may represent any one or more components of a device, server, and/or application server in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and may proceed to optional step 210 or to step 215.

At optional step 210, the processing system (e.g., associated with a "second" public service entity) may provide a uniform resource locator (URL) for a first device of at least a first guest user associated with a first public service entity to initiate a contact with the second public service entity (e.g., with the processing system). For instance, there may be a disaster or public emergency in an area associated with the second PSE, where the second PSE may invite guest users from one or more other PSEs to assist, and where the URL may be used for on-boarding such guest users via their respective devices.

At step 215, the processing system may obtain a notification of at least a first guest user entitled to access at least one network-based resource of the second public service entity, wherein the at least the first guest user is associated with a first public service entity. In one example, the first public service entity and the second public service entity may be members of a same community of interest, where the community of interest has a defined set of attributes which may be assigned to users. For example, the community of interest may comprise a medical community, a law enforcement community, a disaster recovery community, a veterinary community, or a utility service community.

At step 220, the processing system obtains a request from a first device of the first guest user to access the second public service entity (e.g., one or more protected resources thereof). For instance, in one example, the request may be obtained from the first device in accordance with the URL that may be provided at optional step 210. In one example, the request from the first device may be received via a dedicated network slice of a communication network that is reserved for public service entity usage. In one example, the first device may comprise a PSE-managed device (and which is known to a communication network, e.g., a cellular network).

At optional step 225, the processing system may determine a location of the first device. For instance, the processing system may determine a location of first device from cell/base station connection information, asserted global positioning system (GPS) location information, location sensing of the device via wireless beacons deployed in an area/region of the second PSE in communication with the processing system, etc.

At optional step 230, the processing system may transmit a request to the first public service entity to authenticate the first user via the first device. In one example, optional step 230 may be performed in response to the determining at optional step 225 that the location of the first device is within an area associated with the second public service entity. For instance, in one example, the access may be denied without further steps if the location is not correct (e.g., the first device is still in a home area of the first device associated with the first PSE, or elsewhere).

At optional step 235, the processing system may obtain, from the first public service entity, a confirmation of an authentication of the first user via the first device. For instance, the first user may provide login credentials (e.g., username and password) to the processing system (associated with the second PSE), where the processing system can forward the request to access the second PSE by the first device, the first PSE can then present a login credentials to the first PSE for verification, or the first PSE can be notified of the challenge for the first user via the first device (e.g., a push communication to the first device).

At step 240, the processing system queries an attribute provider to obtain one or more attributes of the first guest user. In one example, the querying is performed in response to the determining at optional step 225 that the location of the first device is within an area associated with the second public service entity. In one example, the attribute provider may be one of a plurality of attribute providers that stores users records comprising attributes of users associated with a plurality of public service entities in a community of interest. In one example, the attribute provider maintains attributes for users of a plurality of public service entities of a plurality of communities of interest, where each respective community of interest of the plurality of communities of interest has a different defined set of attributes which may be assigned to respective users associated with respective public service entities of the plurality of public service entities that are members of the respective community of interest.

In one example, the attribute provider may query the first device to confirm that the first user consents for the processing system (or the second PSE) to obtain the one or more attributes of the first user. For instance, this may prevent unauthorized individuals or entities purporting to act on behalf of the second PSE from surreptitiously obtaining attributes of users associated with other PSEs (e.g., where there is no legitimate purpose and where such users have no intention of needing to access to the resources of the second PSE). In one example, the first user may be assigned a role (e.g., "battalion chief," "battalion commander," "engine driver," "truck driver," etc.) and the one or more attributes may be associated with the role. For instance, being an "engine driver" may indicate attributes of "CDL" (commercial driver's license), EMT, and engineer. In one example, the one or more attributes may comprise at least one certification or at least one qualification of the first user for at least one task (and the at least one task may be associated with at least one network-based resource of the second public service entity to which the first user may be granted access).

At optional step 245, the processing system may apply the at least one policy to the one or more attributes, wherein the at least one policy comprises at least one rule that associates at least one attribute with a permission to access the at least one network-based resource. In one example, the one or more attributes may comprise the at least one attribute of the first user. In other words, the first user may have the attribute(s) that are necessary in order to access the at least one network-based resource according to the at least one policy. The at least one policy may be defined by the second public service entity.

At step 250, the processing system grants the first device access to the at least one network-based resource of the second public service entity in accordance with at least one policy based on the one or more attributes. In one example, the granting of the access may include transmitting an instruction to at least one component of a network of the second public service entity that controls an access to the at least one network-based resource, the instruction indicating that the first device is permitted to access the at least one network-based resource. In one example, the granting of the access may include providing an access token to the first device that enables the first device to access at least one network-based resource of the second public service entity.

At optional step 255, the processing system may query the attribute provider to obtain one or more updated attributes of the first guest user. For example, the first guest user's certification(s) may expire or the user may be granted new certification(s) during the course of assisting the second PSE (e.g., the first user may be assisting in disaster recovery for a month or more). In the meantime, the user may obtain test results that qualify the user for additional role(s)/certification(s). Similarly, the user's credential(s) may expire (e.g., certification for driving an ambulance may be good for two years and then the user must take a refresher course, which the user may fail to complete).

At optional step 260, the processing system may terminate the access of the first device to the at least one network-based resource in accordance with at least one policy based on the one or more updated attributes or may grant the first device access to at least a second network-based resource of the second public service entity in accordance with at least one policy based on the one or more updated attributes.

Following step 250 or any of the optional steps 255 or 260, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example, the processing system may repeat steps 215-250 or steps 215-260 for other guest users from the first PSE or another PSE, and so on. In one example, step 215 may precede optional step 210. In one example, the method 200 may include identifying the start of an emergency condition. In one example, the method 200 may include transmitting a notification to one or more other PSEs including the first PSE of a request for guest users of different attributes and/or roles, and receiving responses from the one or more other PSEs of a number of guest users being assigned and/or the specific identities of such guest users (and/or their device identifiers). In one example, the method 200 may include obtaining policy changes from the second PSE. In one example, the method 200 may include detecting an end of an emergency or other conditions, and terminating the access of the first user to the at least one network-based resource (as well as other guest users). In one example, the processing system may be associated with a plurality of public service entities including the second public service entity, where the processing system is configured to enable devices of guest users to access respective network-based resources of the plurality of public service entities. In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the example(s) of FIG. 2 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for granting a first device of at least a first guest user associated with a first public service entity access to at least one network-based resource of a second public service entity in accordance with at least one policy based on one or more attributes obtained from an attribute provider, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for granting a first device of at least a first guest user associated with a first public service entity access to at least one network-based resource of a second public service entity in accordance with at least one policy based on one or more attributes obtained from an attribute provider (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for granting a first device of at least a first guest user associated with a first public service entity access to at least one network-based resource of a second public service entity in accordance with at least one policy based on one or more attributes obtained from an attribute provider (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system associated with a second public service entity, a notification of at least a first guest user to access at least one network-based resource of the second public service entity, wherein the at least the first guest user is associated with a first public service entity;
    obtaining, by the processing system, a request from a first device of the first guest user to access the at least one network-based resource of the second public service entity, wherein the request from the first device is received via a dedicated network slice of a communication network that is reserved for public service entity usage;
    querying, by the processing system, an attribute provider to obtain one or more attributes of the first guest user; and
    granting, by the processing system, the first device an access to the at least one network-based resource of the second public service entity in accordance with at least one policy based on the one or more attributes.

2. The method of claim 1, further comprising:
    providing a uniform resource locator for the first device of the first guest user to initiate a contact with the second public service entity.

3. The method of claim 2, wherein the request is obtained from the first device in accordance with the uniform resource locator.

4. The method of claim 1, further comprising:
    transmitting an authentication request to the first public service entity to authenticate the first guest user via the first device; and
    obtaining, from the first public service entity, a confirmation of an authentication of the first guest user via the first device.

5. The method of claim 1, further comprising:
    applying the at least one policy to the one or more attributes, wherein the at least one policy comprises at least one rule that associates at least one attribute with a permission to access the at least one network-based resource.

6. The method of claim 5, wherein the one or more attributes comprise the at least one attribute.

7. The method of claim 1, further comprising:
    determining a location of the first device.

8. The method of claim 7, wherein the querying is performed in response to determining that the location of the first device is within an area associated with the second public service entity.

9. The method of claim 1, wherein the granting of the access comprises:
    transmitting an instruction to at least one component of a network of the second public service entity that controls an access to the at least one network-based resource, the instruction indicating that the first device is permitted to access the at least one network-based resource.

10. The method of claim 1, further comprising:
    querying the attribute provider to obtain one or more updated attributes of the first guest user.

11. The method of claim 10, further comprising:
    terminating the access of the first device to the at least one network-based resource in accordance with at least one policy based on the one or more updated attributes; or
    granting the first device an access to at least a second network-based resource of the second public service entity in accordance with at least one policy based on the one or more updated attributes.

12. The method of claim 1, wherein the first public service entity and the second public service entity are members of a community of interest, wherein the community of interest has a defined set of attributes which are assigned to a plurality of users.

13. The method of claim 12, wherein the community of interest comprises:
    a medical community;
    a law enforcement community;

a disaster recovery community;
a veterinary community; or
a utility service community.

14. The method of claim 12, wherein the attribute provider maintains attributes for users of a plurality of public service entities of a plurality of communities of interest, wherein each respective community of interest of the plurality of communities of interest has a different defined set of attributes which are assigned to respective users associated with the respective public service entity of the plurality of public service entities that are members of the respective community of interest.

15. The method of claim 1, wherein the first guest user is assigned a role, wherein the one or more attributes are associated with the role.

16. The method of claim 1, wherein the one or more attributes comprise at least one certification or at least one qualification of the first guest user for at least one task.

17. The method of claim 1, wherein the processing system is associated with a plurality of public service entities including the second public service entity, wherein the processing system is configured to enable devices of guest users to access respective network-based resources of the plurality of public service entities.

18. A non-transitory computer-readable medium storing instructions which, when executed by a processing system associated with a second public service entity including at least one processor, cause the processing system to perform operations, the operations comprising:
    obtaining a notification of at least a first guest user to access at least one network-based resource of the second public service entity, wherein the at least the first guest user is associated with a first public service entity;
    obtaining a request from a first device of the at least the first guest user to access the at least one network-based resource of the second public service entity, wherein the request from the first device is received via a dedicated network slice of a communication network that is reserved for public service entity usage;
    querying an attribute provider to obtain one or more attributes of the first guest user; and
    granting the first device an access to the at least one network-based resource of the second public service entity in accordance with at least one policy based on the one or more attributes.

19. An apparatus comprising:
    a processing system associated with a second public service entity including at least one processor; and
    a computer-readable medium storing instructions which, when executed by the processing system, cause the processing system to perform operations, the operations comprising:
        obtaining a notification of at least a first guest user to access at least one network-based resource of the second public service entity, wherein the at least the first guest user is associated with a first public service entity;
        obtaining a request from a first device of the at least the first guest user to access the at least one network-based resource of the second public service entity, wherein the request from the first device is received via a dedicated network slice of a communication network that is reserved for public service entity usage;
        querying an attribute provider to obtain one or more attributes of the first guest user; and
        granting the first device an access to the at least one network-based resource of the second public service entity in accordance with at least one policy based on the one or more attributes.

20. The apparatus of claim 19, wherein the operations further comprise:
    providing a uniform resource locator for the first device of the first guest user to initiate a contact with the second public service entity.

* * * * *